United States Patent
Hanslik

[11] 3,913,897
[45] Oct. 21, 1975

[54] SINGLE-THREAD FEED SCREW FOR EXTRUDERS AND THE LIKE

[75] Inventor: Wilhelm Hanslik, Vienna, Austria

[73] Assignee: Krauss-Maffei AG, Munich, Germany

[22] Filed: Nov. 21, 1973

[21] Appl. No.: 417,753

[30] Foreign Application Priority Data
Nov. 21, 1973 Germany............................ 2257007

[52] U.S. Cl. ...................... 259/191; 259/9; 259/97; 415/72; 416/176; 425/208
[51] Int. Cl.² .......................................... B29B 1/10
[58] Field of Search ...... 259/191, 192, 193, DIG. 1, 259/97, 10, 5, 9, 25, 26, 45, 46; 425/207, 425/208; 415/72; 416/176

[56] References Cited
UNITED STATES PATENTS
| | | | |
|---|---|---|---|
| 2,863,649 | 12/1958 | Grubb et al............................ | 259/9 |
| 3,023,455 | 3/1962 | Geier et al............................. | 259/9 |
| 3,219,320 | 11/1965 | Sutter..................................... | 259/5 |
| 3,273,201 | 9/1966 | Reifenhauser...................... | 425/208 |

FOREIGN PATENTS OR APPLICATIONS
1,142,059 1963 Germany........................... 259/191

Primary Examiner—Harvey C. Hornsby
Assistant Examiner—James A. Niegowski
Attorney, Agent, or Firm—Karl F. Ross; Herbert Dubno

[57] ABSTRACT

The thread of a one-thread feed screw is interrupted at several locations in a compression zone to form gaps between the end of the last turn of a preceding thread section and the beginning of the first turn of the next-following thread section, each thread section encompassing two to three turns. The several thread sections may be of like or different length but in either case are so dimensioned that alternate gaps lie on opposite sides of the screw core.

12 Claims, 5 Drawing Figures

U.S. Patent    Oct. 21, 1975    3,913,897
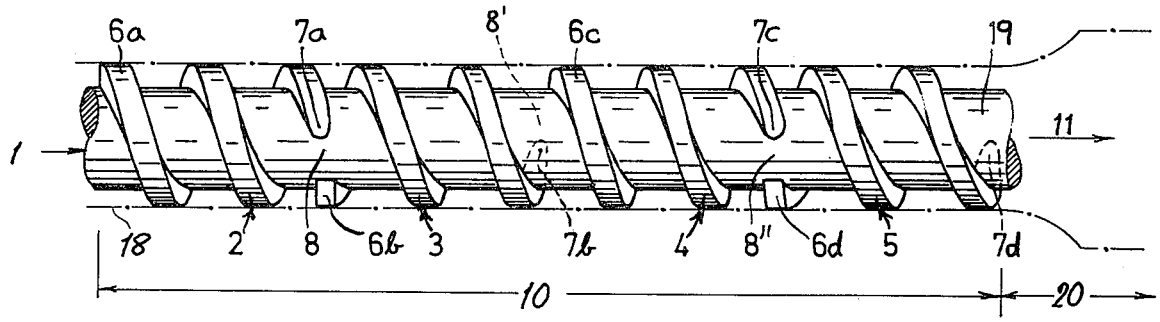
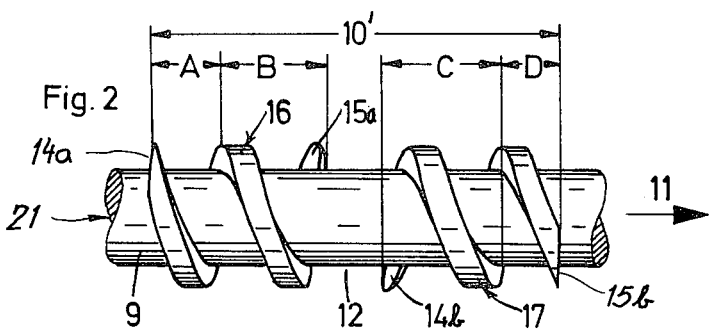
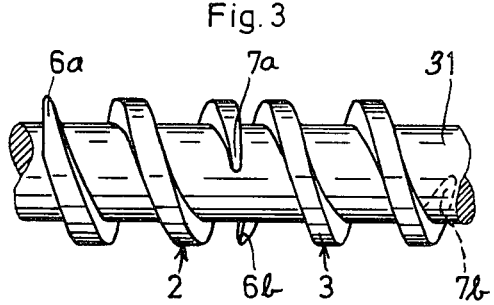
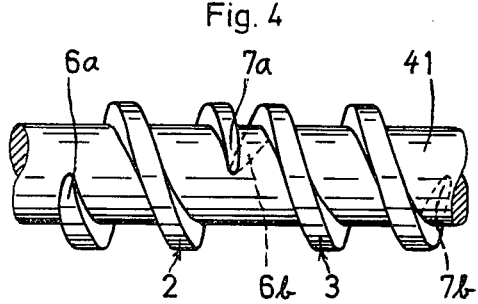
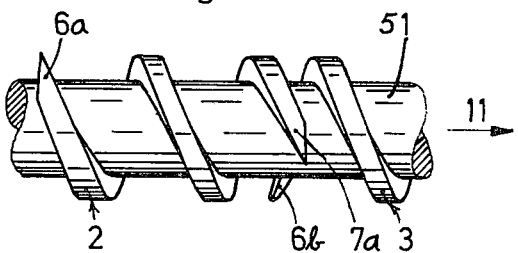

SINGLE-THREAD FEED SCREW FOR EXTRUDERS AND THE LIKE

FIELD OF THE INVENTION

My present invention relates to an extruder for thermoplastic resins or the like, e.g. as used to plasticize the material and feed it to a mold cavity of an injection-molding machine with one or more driven feed screws lodged in a generally cylindrical housing and defining therewith an upstream compression zone and a downstream expansion zone.

BACKGROUND OF THE INVENTION

The changeover from compression to expansion in such a housing, upstream of its nozzle, may be accomplished in various ways, as by altering the pitch and/or the depth of the thread or by widening the housing internally to form a mastication space. In each instance the plastic material exiting from the compression zone into the expansion zone experiences a certain decompression with resulting evolution of vapors which may be allowed to escape through a degasification port; such a system is described, for example, in commonly owned application Ser. No. 111,442 filed by Bernd F. Bielfeldt et al on Feb. 1, 1971 now U.S. Pat. No. 3,804,381.

If, as has heretofore generally been the case, the compression zones encompasses a substantial length (e.g. four or more turns of a single thread) of the feed screw, or of each of several intermeshing feed screws, then the helicoidal web forming the screw thread is subjected to codirectional axial pressures on successive turns as a result of the progressively increasing pressure differential. With normal operating pressures in a range of about 100 – 300 kp/cm$^2$ (kp = kilopond or kilogram-force), this pressure differential leads to appreciable wear of the web and of the surrounding peripheral wall of the cylindrical housing bore.

With the pressure varying monotonically along the helicoidal web, pressure differentials occur not only in the axial but also in the radial direction as well as peripherally. This gives rise to centrally directed stresses which, especially in the case of intermeshing feed screws, generate radial thrusts as explained in my copending application Ser. No. 400,059 filed Sept. 9, 1973. Such radial thrusts, in turn, create undesirable friction between the feed screws and the surrounding housing wall, with local overheating of the extrusion system and resulting impairment of the uniformity of the plastic mass.

OBJECT OF THE INVENTION

My present invention aims at avoiding these drawbacks in an extruder comprising one or more feed screws, especially those of the one-thread kind, serving to plasticize an advancing heat-softenable mass as discussed above.

SUMMARY OF THE INVENTION

In accordance with the present invention, the thread of the feed screw is divided by one or more peripheral gaps into a plurality of sections axially adjoining one another within a compression zone. The presence of the gaps intermittently reverses the gradient of the pressure differential and establishes a more uniform pressure distribution throughout the compression zone here considered.

Advantageously, each thread section comprises only a small number of turns, preferably ranging between two and three.

According to a more particular feature of my invention, designed to establish a symmetrical stress distribution with reference to the screw axis, the length of each section and of each intervening gap is so chosen that an extremity (leading or trailing end) of one section is peripherally offset by about 180° from an extremity of an adjoining section. More specifically, with a gap length of about 90° or 180° (i.e. one or two quarter-turns), the angular spacing between corresponding extremities -- leading or trailing ends -- of adjoining sections may be 900° as measured around the intervening turns.

According to another desirable feature of my invention, the symmetry of stress distribution is further enhanced by making the number of section extremities on one side of the axis equal to the number of such extremities on the other side, at least within the compression zone, with the intervening gaps lying alternately on these two sides.

In general, the several sections may all extend on a common helicoidal line of constant or varying pitch, i.e. form part of a discontinuous but otherwise conventional thread. However, it is also possible to dispose alternate sections on interleaved helicoidal lines, as through they were parts of different threads of a multithread screw, and to separate adjoining extremities of these sections by a fraction of a pitch length. The axial spacing of these adjoining extremities may in that case be positive (as in the first-mentioned instance), zero (with the extremities lying in a common radial plane), or negative (i.e. with axially overlapping extremities).

BRIEF DESCRIPTION OF THE DRAWING

The above and other features of my invention will be described in detail hereinafter with reference to the accompanying drawing in which: FIG. 1 is an elevational view of a representative part of a one-thread feed screw of an extruder embodying my invention; and FIG. 2 – 5 are views similar to FIG. 1 but showing various modifications.

SPECIFIC DESCRIPTION

In FIG. 1 I have shown at 18, in phantom lines, the inner wall of an extruder cylinder of conventional structure, preferably heated, together with a one-thread feed screw 1 defining therewith a compression zone 10 and an expansion zone 20. Screw 1 has a core 19 which carries a helical web forming a discontinuous thread of constant pitch divided into four sections 2, 3, 4, 5 by intervening peripheral gaps 8, 8' and 8''. Screw 1 is driven by a nonillustrated motor in such a sense as to advance the plastic mass in the direction of arrow 11, i.e. to the right as viewed in the drawing. Sections 2 – 5 are of uniform length, equal to about 2¼ turns or 810° measured peripherally, so that their leading ends 6a, 6b, 6c, 6d are angularly offset from their trailing ends 7a, 7b, 7c, 7d by 90°; as each gap 8, 8', 8'' has a width of 90°, the angular offset of the peripherally staggered trailing or upstream ends 6a – 6d as well as that of the similarly staggered leading or downstream ends 7a – 7d of successive sections equals about 180°. Each thread section thus encompasses more than two but less than three turns.

In FIG. 2 I have shown a generally similar feed screw 21 with a core 9 and a web forming two thread sections 16 and 17 within a compression zone 10', each section encompassing two turns defining compartments A, B, C and D. Extremities 14a, 15a of section 16 and 14b, 15b of section 17 lie in a common radial plane, with extremities 15a and 14b peripherally offset by 180° to form a gap 12. In the operation of an extruder equipped with such a feed screw, compartments A and C are virtually free from any pressure gradient whereas oppositely directed gradients develop along the confronting flanks of the web at the boundaries of compartments A, B and C, D. Such balanced pressure drops or pressure rises occur also with feed screw 1 of FIG. 1.

In FIG. 3 I have shown part of a feed screw 31 which is similar to screw 1 of FIG. 1, except that adjoining extremities 7a and 6b of its sections 2 and 3 (the only ones illustrated in this Figure) lie in approximately a common radial plane and are angularly offset by 90°. The peripheral length of each section is again 810°. Thus, the two sections 2 and 3 no longer extend on a common helical or helicoidal line as shown in FIG. 1; this results in a foreshortening of the overall length of the screw.

FIG. 4 illustrates a similar feed screw 41 with extremities 7a and 6b of sections 2 and 3 again coplanar but mutually offset by 180°, each section here encompassing two full turns. Therefore, as in the preceding embodiments, the angular spacing between corresponding extremities 6a, 6b or 7a, 7b is 900°.

In FIG. 5, finally, there is shown part of a feed screw 51 which differs from screw 41 of FIG. 4 in that the extremity 6b has been extended by 90° so that ends 6b and 7a now overlap axially.

In both FIGS. 4 and 5 the axial spacing of the last turn of section 2 from the first turn of section 3 (as measured between centers of their thread ridges) is half a pitch length. The two sections 2 and 3 may therefore be considered as lying on interleaved helical lines and as being cut from respective threads of a two-thread screw; this is in fact an advantageous way of manufacturing such a feed screw.

It should be noted that the pitch of the several thread sections 2 – 5 or 16, 17 need not be uniform, as shown, but could vary within a thread section or from one section to the next. Thus, for example, a reduction in the pitch angle of extremities 7a and 6b in FIG. 3 enables the axial spacing of all other turns from one another to be made uniform.

I claim:

1. In an extruder comprising a generally cylindrical housing and a driven feed screw in said housing defining therewith an upstream compression zone and a downstream expansion zone, the improvement wherein said feed screw has a single thread divided by at least one peripheral gap into a plurality of sections axially adjoining one another within said compressing zone, each of said sections extending over at least one full turn of thread, successive sections terminating in peripherally staggered downstream ends said downstream ends of the successive sections being peripherally offset from each other by about 180° degrees.

2. The improvement defined in claim 1 wherein the length of each gap and the length of each section amounts to substantially a whole number of quarter-turns.

3. The improvement defined in claim 2 wherein each gap has a length ranging between substantially one and two quarter-turns.

4. The improvement defined in claim 3 wherein each section encompasses between two and three turns.

5. The improvement defined in claim 4 wherein the angular spacing between said downstream ends of adjoining sections is 900° as measured around the intervening turns.

6. The improvement defined in claim 1 wherein said sections have the same number of downstream ends disposed on opposite sides within said compression zone, the number of said sections being greater than two with alternate gaps disposed on opposite sides of the axis of said feed screw.

7. The improvement defined in claim 1 wherein said sections all lie on a common helicoidal line.

8. The improvement defined in claim 1 wherein alternate sections lie on interleaved helicoidal lines and have adjoining turns separated by a fraction of a pitch length.

9. The improvement defined in claim 8 wherein the ends of said adjoining turns axially overlap.

10. The improvement defined in claim 8 wherein the ends of said adjoining turns lie in a common radial plane.

11. The improvement defined in claim 10 wherein said sections are all of the same length.

12. The improvement defined in claim 10 wherein adjoining sections have upstream ends peripherally offset from each other by about 180°.

* * * * *